Oct. 10, 1939.   R. S. SANFORD   2,175,219
AUTOMOTIVE CONTROL
Filed Feb. 24, 1932   2 Sheets-Sheet 2

INVENTOR.
ROY S. SANFORD
BY
ATTORNEY

Patented Oct. 10, 1939

2,175,219

UNITED STATES PATENT OFFICE 2,175,219

AUTOMOTIVE CONTROL

Roy S. Sanford, South Bend, Ind., assignor to Bendix Aviation Corporation, South Bend, Ind., a corporation of Delaware Application February 24, 1932, Serial No. 594,845

18 Claims. (Cl. 192—.01)

This invention relates to automotive vehicle control mechanisms and more particularly to power actuation thereof.

One of the objects of the present invention is to provide a novel means for operating an automotive vehicle control mechanism such as, for example, the vehicle clutch.

Another object of the invention is to provide a novel means for operating or controlling an automotive vehicle clutch by power in such a manner that smooth and efficient engagement of the cooperating members of the clutch will be effected at all times.

Another object is to provide in a power actuated vehicle clutch, novel governing mechanism for securing engagement of the cooperating members of the clutch, only when the rotative speeds of such members are substantially the same, thereby effecting smooth and efficient engagement of these members under substantially all conditions of operation.

Still another object is to provide a novel arrangement of parts embodying a fluid-operated power actuator for an automotive vehicle clutch controllable by the position of the throttle of the vehicle engine, together with novel means responsive to the relative speed of the cooperating members of the clutch for controlling such power actuator, in order to prevent engagement of the clutch members when the rotative speeds of the latter are not substantially the same.

A further object is to provide in a device of the above character, novel electrically-controlled means for influencing the operation of the power actuating device in order to prevent clutch-engaging movement thereof in the event that the cooperating members of the clutch are rotating relatively to each other.

Further objects and novel features of the invention will appear more fully hereinafter from the following description when taken in connection with the accompanying drawings, wherein there is illustrated one form of the invention. It is to be expressly understood, however, that the drawings are for purposes of illustration only and are not designed as a definition of the limits of the invention, reference being had for this purpose to the appended claims.

In the drawings, wherein similar reference characters refer to like parts throughout the several views:

Figure 4 is a diagrammatic view of a modified form of engine-driven generator which may be employed with the present invention.

Figure 1:
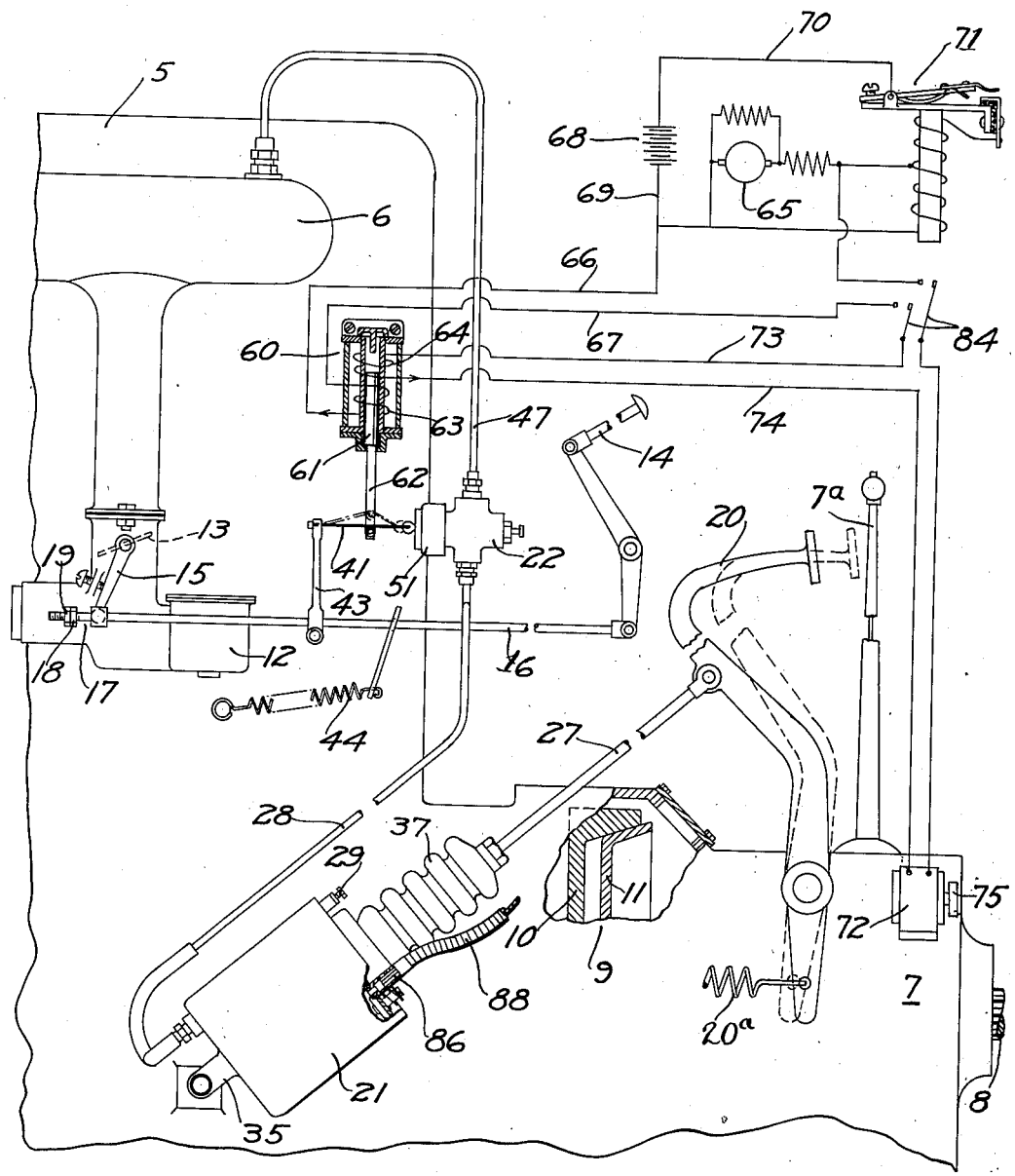
Figure 1 is a diagrammatic view of a portion of an automotive vehicle embodying the present invention.

Referring more particularly to Figure 1, a portion of an automotive vehicle embodying the present invention is diagrammatically shown therein as including an internal-combustion engine 5 having a throttle-controlled intake manifold 6, the said engine being adapted to be drivably connected through a change-speed transmission 7, and associated operating lever 7ª, with a drive or driven shaft 8, there being provided a clutch 9, comprising driving and driven members 10 and 11, interposed between the engine and transmission, as well understood by those skilled in the art. In order to supply an explosive mixture to the engine 5, a carburetor 12 communicates with the intake manifold 6, the amount of explosive mixture to said manifold being controlled by suitable throttle connections including a throttle valve 13 and an accelerator pedal 14, the said valve and pedal being interconnected by means of a lever arm 15 secured to the throttle valve, and a link 16, there being preferably provided a lost motion connection 17 between these last two named members effected by permitting a limited amount of sliding movement between the cooperating end portions thereof, the extent of such movement being adjustable by means of stop nuts 18 and 19, for a purpose which will appear more fully hereinafter. A suitable clutch-actuating element comprising a pedal member 20 is provided for manually engaging and disengaging the clutch 9, and in accordance with well-known practice such element is positioned adjacent the usual manually-operable vehicle control members, including the accelerator 14, in order to be within easy reach of the operator.

Means are provided by the present invention for securing selective free-wheeling or coasting of the vehicle, and preferably such means are so constituted as to obviate the necessity of manual operation of the clutch-actuating element 20 during operation of the selective gear transmission by movement of the lever 7ª. As shown, such means comprise a clutch power actuating device 21 operable by fluid pressure, such as for example, by the reduced pressure or partial vacuum obtainable from the intake manifold 6, the communication between the manifold and the power actuator being controlled by a valve mechanism 22 operated in accordance with the movement of the throttle actuating connections in such a manner that when the accelerator 14 is in neutral or retracted position, the valve will establish communication between the intake manifold and the power actuator to effect clutch-disengaging operation of the latter, while when the accelerator is depressed, the valve will cut off such communication and vent the actuator to atmosphere whereupon the clutch will be engaged by means of the usual clutch return spring 20ª.

Figure 2:
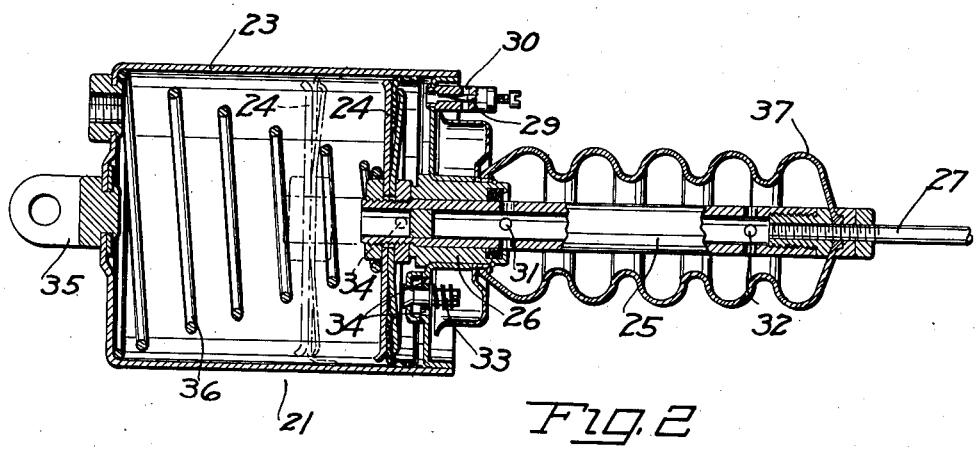
Figure 2 is a longitudinal section of the clutch power actuator.

Referring more particularly to Figure 2, the clutch power actuator 21 comprises a cylinder 23 having a piston 24 therein, the latter being provided with a hollow piston rod 24 slidable through a bushing or sleeve 26 and rigidly connected to the piston at one end and connected at the other end with a rod or link 27 pivotally secured to the clutch-actuating element 20. One end of the cylinder communicates with the valve mechanism 22 through a conduit 28, while the other end communicates at all times with the atmosphere through an adjustable needle valve 29, controlling bleed ports 30. Communication between the upper end of the cylinder and the atmosphere is also effected by means of the hollow piston rod 25 and ports 31 and 32 therein when the piston is moving from the lower end of the cylinder, as viewed in this figure, to the dotted line position, it being apparent, however, that as the piston moves from the last-named position to the position shown in full lines, the ports 31 will be cut off by the bushing 26. In order to permit rapid downward movement of the piston 24 to effect clutch disengagement, an inwardly opening check valve 33 is provided controlling ports 34 leading to the atmosphere. A bracket 35 is preferably secured in any suitable manner to the lower end portion of the cylinder 23 for mounting the actuator upon a suitable stationary portion of the vehicle. If desired, a resilient member such as an expansion spring 36 may be positioned between the lower end of the cylinder 23 and the under side of the piston 24 in order to assist movement of the piston and clutch-actuating element to clutch-engaging position. For the purpose of protecting the hollow piston rod from dust, water, etc., a suitable resilient covering 37 is illustrated as surrounding this member.

Figure 3:
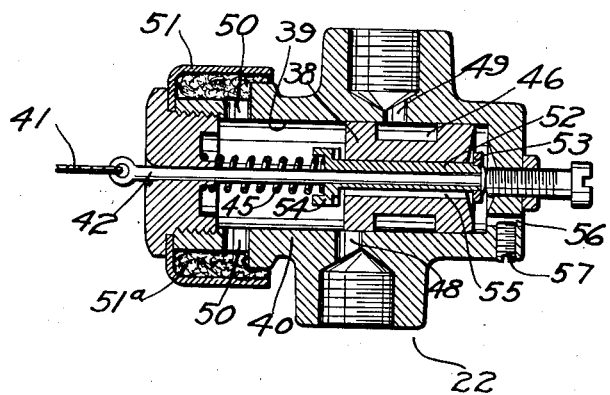
Figure 3 is a sectional view of the control valve shown in Figure 1.

In order to selectively control communication between the intake manifold and the power actuator, and between the latter and the atmosphere in accordance with the position of the accelerator pedal 14, the valve mechanism 22, heretofore referred to, embodies a piston valve 38, Figure 3, slidably mounted within a bore 39 of valve casing 40, and operatively connected with the link 16 by means of a suitable flexible connection, such as a wire cable 41, one end of which is connected to a valve rod 42, the other end being carried by an arm 43 secured to the link 16. Normally, when the engine 5 is idling and the accelerator is in retracted position, a spring 44, operatively connected between the link 16 and a suitable stationary portion of the vehicle, is effective to overcome the effect of a spring 45, see Figure 3, in order to move valve 38 toward the left and establish communication between the conduit 28 and the intake manifold 6 by means of an annular valve port 46 and conduit 47, the said valve port simultaneously registering with ports 48 and 49. However, upon manual depression of the accelerator 14, to effect an opening of the throttle 13, the link 16 and arm 43 are moved to the right, as viewed in Figure 1, whereupon the spring 45 is effective to move the valve to the position shown in Figure 3, thus interrupting communication between the intake manifold and the power actuator and establishing communication between the latter and the atmosphere through conduit 28, port 48, bore 39, and a plurality of apertures 50 provided in casing 40. A cap 51, carried by the end of the valve casing 40, may be provided in order to prevent water, etc., from entering the valve mechanism, and if desired, a suitable filtering material 51ª may be housed within the cap in order to filter the air passing to the actuator.

Preferably, the valve rod 42 carries at its inner end a sleeve 52 on which the valve 38 is slidably mounted, there being a slight amount of lost motion between said sleeve and valve predetermined by the position of a stop member 53 upon one end of the sleeve and a valve member 54 at the other end of the sleeve. An axial bore 55 is also provided in the sleeve, normally unobstructed at the right-hand end portion and adapted to be controlled by the valve member 54 at the other end portion, such construction being provided for the purpose of reducing the tendency of the formation of a partial vacuum within the valve casing to the right of the valve 38 when the latter is moved rapidly to the left, such movement being effected by removal of the foot of the operator from the accelerator pedal when it is desired to free-wheel or coast. A small aperture 56, the degree of opening of which is controlled by an adjustable screw 57, is provided in the end wall of the valve casing in order to prevent any dashpot action of the valve during movement of the latter to the right during acceleration of the engine.

From the above construction, it will be apparent that when the internal-combustion engine is idling, that is, when the accelerator is in normal or retracted position, the valve 38 occupies such a position as to establish communication between conduits 28 and 47 thus connecting the power actuator with the intake manifold. By reason of the reduction in pressure in the power actuator, below the piston 24, the said piston and clutch-actuating element 20 connected therewith will be moved downwardly, as viewed in Figure 1, thereby effecting a disengagement of the clutch members 10 and 11 and permitting free-wheeling or coasting of the vehicle. When it is desired to reengage the clutch members, in order to utilize the engine as a brake, or to accelerate the vehicle after operation of the change-speed gearing of the transmission, it is merely necessary to depress the accelerator pedal a sufficient amount to take up the lost motion connection 17, such movement permitting the valve 38 to move to the right, as viewed in Figure 3, to cut off communication between the conduits 28 and 47 and connect the first-named conduit with the atmosphere through ports 50. The pressure within the power actuator below the piston 24 will then be increased to such an extent as to permit upward movement of the piston by means of the resilient member 36 and the clutch return spring 20ª, to effect engagement of the clutch. It will be appreciated that during the clutch-engaging operation, the initial travel of the piston will be substantially rapid, due to the provision of ports 30, 31 and 32, such initial travel serving merely to take up the slack or lost motion usually provided in the clutch connections. The ports are preferably so adjusted that the clutch members will be in light frictional engagement when the port 31 is covered by the sleeve 26, it being apparent that further movement of the piston to effect complete engagement of the clutch members will be relatively slow, by reason of the slow exhausting of air through the air bleed port 30. It is also desired to point out that during this last-referred to movement of the piston and clutch-actuating element, the engine throttle will be gradually opened in order to accelerate the vehicle simultaneously with the complete engagement of the clutch.

In order to control the clutch members to effect engagement therebetween only when the relative speeds of said members are substantially the same, thus obtaining a smooth and efficient transfer of power or energy from one clutch member to the other, means are provided for controlling the operation of the clutch power actuator in accordance with the relative speeds of the clutch members, and preferably such means are associated with the control valve. As shown, the above-referred to means are electrical in character and are constituted by a suitable electromagnetically operated solenoid 60 having a core 61, operatively connected to the flexible valve operating connection 41 by an arm 62, there being provided a pair of differentially wound coils or windings 63 and 64 surrounding the core 61. Winding 63 is adapted to be energized by the usual generator 65 associated with automotive vehicle engines, such generator being illustrated as connected to the said winding by means of leads 66 and 67. A battery 68 is connected across the generator terminals by connections 69 and 70, the last-named connection including a cut-out switch 71 for preventing discharge of the battery through the generator when the voltage of the latter is less than that of the battery.

The winding 64 is adapted to be energized from a generator 72 through leads 73 and 74, the said generator being driven by connections, not shown, interconnecting the driven clutch member 11 and the generator. It will be observed from Figure 1 that the coils 63 and 64 are differentially wound and that the connections thereto are such that the current therein flows in opposite directions, thus effecting a substantial neutralization of the flux caused by each coil when the currents therein are substantially equal. Preferably the characteristics of the generators 65 and 72 are such as to cause currents of equal value to flow in the respective coils 63 and 64 when the clutch members 10 and 11 are rotating at substantially the same speed. When such conditions occur, that is when the effective flux in the core 61 is substantially neutralized, the weight of the latter will be effective to move the same downwardly and permit operation of the control valve mechanism 22 in a manner such as that hereinbefore described.

It will be readily apparent from the above construction that when the operator permits the accelerator to return to neutral or retracted position, the connection between the intake manifold and the power actuator is operated, as above described, and the clutch will be disengaged, it being understood that due to the relative high speed of the generator 65 the coil 64 associated therewith will be effective to attract the core 61, thus moving the flexible connection 41 to its dotted line position, Figure 1. When it is now desired to engage the clutch, in order to employ the engine as a brake for example, or in order to accelerate the vehicle, it is merely necessary to depress the accelerator pedal 14 to effect movement of the throttle connection 16 and arm 43 toward the right, Figure 1. As heretofore stated, the connection 41 is maintained in its dotted line position under these conditions, so that such movement of the arm 43 toward the right will not permit the spring 45 to return the valve 38 to such a position as to permit connection of the actuator to atmosphere and consequent engagement of the clutch members. When, however, the throttle connections are moved further in order to accelerate the engine, the valve 38 will be moved to the above-mentioned position as soon as the flux in coil 63 is of such value as to substantially neutralize the flux in coil 64, or in other words, the clutch members will be engaged as soon as the speeds of such members are substantially the same. It will be readily apparent from such arrangement that the clutch members will thus only be engaged when the relative speed thereof is substantially zero, thus effecting a most efficient and smooth clutching action and avoiding the objectionable jerking and bucking effects arising from the engagement of clutch members which are rotating at substantially different speeds.

In some instances, it may be desirable to utilize a small generator, which shall be separate and distinct from the vehicle battery charging generator 65, for operating the solenoid 60, in which event, referring to Figure 4, a small shunt-wound generator 80 may be employed, which may be driven by any suitable rotating portion of the engine, the speed of which is proportional to that of the driving clutch member, and connected to the coil 63 by leads 81 and 82.

The above-described electrical governor means is designed to operate when the driven clutch plate 11 is in motion, for if said plate is stationary it is evident that the control valve 22 could not be operated to permit the clutch to engage. In order, therefore, to permit the engagement of the clutch in starting the vehicle in motion with the change-speed transmission in any of low, reverse or intermediate gears, the aforementioned electrical governor is rendered operative only when the transmission is in high gear. To this end a switch 84 is incorporated in the electrical connection, said switch being operable by the gear shift lever 7ª when the same is moved to place the transmission in high gear. The switch 84 may be operated by any suitable means such as the transmission shifter rod, not shown, the latter being operable by the lever 7ª. The car may thus be started in second gear as well as in low or reverse as is the usual custom.

In order to expedite the engagement of the clutch after the clutch plates have attained synchronous speeds and in order to obviate an undesirable operation of the solenoid by an excessive opening of the throttle, there may be incorporated in the motor a supplemental manually-operated bleed valve 86. When the vehicle is free-wheeling this valve may be opened, preferably by the operation of a Bowden control 88, thus insuring a very rapid efflux of air from the clutch motor and consequently effecting a rapid clutch engagement. At all other times the valve 86 may be kept closed, thus insuring the variable and controlled engagement of the clutch by the means heretofore described.

There is thus provided by the present invention a novel clutch actuating mechanism so constructed and arranged as to permit engagement of the cooperating clutch members only when the speeds of rotation thereof are substantially the same. By providing electrically-operable means for controlling the clutch power actuator in accordance with the rotative speeds of the clutch members, an unusually accurate and efficient mechanism is obtained, and one which is simple and inexpensive in its installation and operation.

While one embodiment of the invention has been shown and described herein, it is to be expressly understood that the same is not limited thereto but may be embodied in other forms, as well understood by those skilled in the art. Reference will therefore be had to the appended claims for a definition of the limits of the invention.

What is claimed is:

1. In combination with a power actuated automotive clutch having driving and driven members, power means for engaging and disengaging said clutch members, movable means for controlling the clutch-engaging and clutch-disengaging movement of said power means, and electrically-operated means for preventing movement of said controlling means to effect clutch-engaging operation of said power means when said clutch driving and driven members are rotating relative to each other.

2. In an automotive vehicle, a clutch having driving and driven members, a power actuator for engaging and disengaging said clutch members, means for controlling the clutch-engaging and clutch-disengaging movement of said power actuator, and means for preventing movement of said control means to cause the engagement of said members by said power actuator when said members are rotating relative to each other, said preventing means including electrically-operable devices responsive to the speeds of said members.

3. In a clutch having driving and driven members, a pneumatic power actuator for engaging and disengaging said clutch members, movable valve means for controlling the engaging and disengaging operation of said actuator, and means associated with said valve means permitting movement of the latter for effecting operation of said actuator to engage said clutch members only when said members rotate at substantially the same speed.

4. A power actuated automotive clutch comprising driving and driven members, a fluid motor for engaging and disengaging said members, a valve controlling a source of fluid pressure for said motor, movable means for actuating said valve, electromagnetic means for rendering said moving means inoperative to actuate said valve, and electrical means for exciting said electromagnetic means in accordance with the difference of the speeds of said driving and driven members.

5. In combination with an automotive vehicle having an internal-combustion engine, a clutch having driving and driven members, an accelerator for said engine, a fluid motor for engaging and disengaging said clutch members, and accelerator-controlled means including a valve for controlling the operation of the fluid motor, said valve in one position of adjustment establishing communication between the actuator and a source of actuating fluid and in another position of adjustment establishing communication between the motor and atmosphere, and speed-responsive means including electrically-operable devices associated with said valve for preventing movement of said valve from the first to the second-named position when the speed of one clutch member differs from that of the other.

6. In an automotive vehicle, the combination with a change-speed transmission mechanism and an internal-combustion engine having a throttle-controlled intake manifold, of a clutch-actuating element, a driven member, a clutch interposed between said engine and member and adapted to be actuated by said element, and means to operate said element comprising a cylinder, a piston therein operatively connected with said element, a conduit between said cylinder and the intake manifold, a valve in said conduit for controlling communication between the cylinder and the intake manifold and between the cylinder and the atmosphere, an accelerator pedal operatively connected with the throttle and with said valve adapted to simultaneously operate said throttle and valve, electrical means dependent upon the relative speeds of said engine and driven member for controlling said valve independently of said accelerator pedal, and means, operated by said transmission mechanism, for rendering said electrical means operative for the purpose intended.

7. An automotive vehicle including a transmission and a clutch, the latter comprising driving and driven members, suction operated power means for effecting engagement and disengagement of said clutch members, means including a valve for controlling the operation of said power means to effect engagement and disengagement of said clutch members, electrical means operable in accordance with the relative speed of said clutch members for controlling the movement of said valve and means operable by the operator of the vehicle for cutting in the operation of said electrical means when and if the transmission is in its highest gear ratio.

8. In an automotive vehicle provided with a clutch and a change-speed transmission, power means for operating the clutch including valve means for controlling the operation of the power means, and means for operating the valve means including means operable by the transmission, when the same is in high gear and the driving and driven elements of the clutch are rotating at different or substantially different speeds, to prevent a clutch engaging operation of the power means.

9. In an automotive vehicle provided with a clutch and a change-speed transmission, power means for operating the clutch including valvular means operative to insure two stages of clutch engaging operation of the power means, and means operable by the transmission, when the same is established in high gear and the driving and driven elements of the clutch are rotating at different or substantially different speeds, for preventing the initiation of the clutch engaging operation of the power means.

10. In an automotive vehicle provided with a clutch, power means for operating the clutch comprising a double-ended pressure differential operated motor, valvular means for controlling the clutch engaging and disengaging operations of the motor including means for insuring two stages of clutch engaging operation of the motor, together with means, selectively operable at the will of the driver, for temporarily changing the effectiveness of the operation of said latter means in effecting the second of said stages of clutch engagement to thereby provide a substantially uniform engagement of the clutch.

11. In an automotive vehicle provided with a transmission and a clutch having driving and driven elements, power means for operating the clutch, said means including valvular means for initiating the clutch engaging and disengaging operations of the power means, and other valvular means for insuring two stages of clutch engagement, together with means operable by the transmission when in high gear for preventing an operation of the aforementioned initiating means until the driving and driven clutch elements are rotating at the same or substantially the same speed.

12. In an automotive vehicle provided with a transmission and a clutch having driving and driven elements, power means for operating the clutch, said means including valvular means for initiating the clutch engaging and disengaging operations of the power means, and other valvular means for insuring two stages of clutch engagement, together with means operable by the transmission when in high gear for preventing an operation of the aforementioned initiating means until the driving and driven clutch elements are rotating at the same or substantially the same speed, and selectively operable means operative to facilitate the engagement of the clutch when the transmission is in high gear by changing the effectiveness of the operation of the aforementioned means in effecting the second stage of clutch engagement.

13. In an automotive vehicle provided with a clutch and a change-speed transmission, power means for operating the clutch including valvular means, and means operable, when the transmission is established in high gear and the driving and driven elements of the clutch are rotating at different or substantially different speeds, for preventing the operation of the power means.

14. In an automotive vehicle provided with a clutch and a transmission, power means for effecting controlled disengagement and engagement of the clutch, valvular means for controlling the operation of said power means including means for initiating the clutch engaging and disengaging operations of the power means, and other means for controlling the clutch engaging operation of the power means, together with means operated in part by the generator of the vehicle and in part by means operated by the driven clutch element, for selectively permitting or preventing an operation of the power means.

15. In an automotive vehicle provided with a clutch and a transmission, power means for so operating the clutch as to simulate a conventional manual operation thereof, valvular means for controlling the operation of said power means, and means operable by the transmission, in any one of its low, reverse or second gear operative positions, to so control said valvular means as to permit the aforementioned normal operation of the power means, said means being further operable, when the transmission is in its high gear position and the driving and driven elements of the clutch are rotating at different or substantially different speeds, to control at least one of the normal operations of the power means.

16. The combination of an internal-combustion engine, a vacuum operated clutch, a variable gear shift, an accelerator, power means effective to render the clutch operable by the vacuum, accelerator operated means for rendering the vacuum available to the power means when the accelerator is in released position, said last means including control valve means operable to initiate the clutch disengaging and engaging operations of the power means, and means operable by movement of the gear shift to high gear position to control the operation of said control valve means.

17. An automotive clutch comprising driving and driven members, a suction operated fluid motor for effecting movement of the driven clutch member into and out of engagement with respect to the driving clutch member, a valve for controlling communication between a source of suction and the motor to effect clutch disengagement and for controlling communication between atmosphere and the motor to effect clutch engagement, and electrically actuated means for maintaining said valve in said first-named position when the speed of one clutch member differs from that of the other, and for effecting movement of said valve to the second-named position when the speeds of said clutch members are substantially identical.

18. In an automotive vehicle provided with a clutch and a change-gear transmission, power means including a pressure differential operated motor operably connected to the clutch, a valve for controlling the operation of said motor, power means for controlling the operation of said valve, and means operable by movement of the transmission to a predetermined gear-engaged position to energize said second power means.

ROY S. SANFORD.